United States Patent
Hartman

(10) Patent No.: US 6,565,107 B1
(45) Date of Patent: May 20, 2003

(54) MOTORBIKE SOUND SIMULATOR

(76) Inventor: Lawrence B. Hartman, 5221 Beech St., Bellaire, TX (US) 77401

( * ) Notice: Subject to any disclaimer, the term of this patent is extended or adjusted under 35 U.S.C. 154(b) by 0 days.

(21) Appl. No.: 10/001,162

(22) Filed: Dec. 4, 2001

(51) Int. Cl.$^7$ .............................. B62J 3/00; A63H 5/00
(52) U.S. Cl. ..................... 280/288.4; 446/404; 446/415
(58) Field of Search .................. 280/288.4; 446/404, 446/409, 415, 397

(56) References Cited

U.S. PATENT DOCUMENTS

| | | | | |
|---|---|---|---|---|
| 2,557,263 A | * | 6/1951 | Davis ........................ | 280/288.4 |
| 2,624,156 A | * | 1/1953 | Meyer, Jr. ................... | 446/404 |
| 2,736,136 A | * | 2/1956 | Modlin ....................... | 446/404 |
| 2,894,357 A | * | 7/1959 | Munro ........................ | 446/404 |
| 4,018,450 A | * | 4/1977 | Rutledge .................... | 280/288.4 |
| 5,226,846 A | * | 7/1993 | Omori ........................ | 446/404 |
| 5,611,558 A | * | 3/1997 | Randmae .................... | 280/288.4 |
| 6,039,338 A | * | 3/2000 | Perea et al. ............... | 280/288.4 |

* cited by examiner

Primary Examiner—Lesley D. Morris
Assistant Examiner—Matthew Luby
(74) Attorney, Agent, or Firm—Bill B. Berryhill

(57) ABSTRACT

A device for attachment to a bicycle which includes a flat strap of semi-rigid plastic a substantial portion of which is straight terminating in a free distal end. A portion of the strap is bent at a proximal end thereof against itself forming an area of double thickness. A fastener is engageable with the strap at the proximal end thereof to affix the apparatus to the bicycle so that the distal end of the strap may be sequentially engaged by the spokes of a rotating bicycle wheel to simulate the sound of a motor.

7 Claims, 1 Drawing Sheet

MOTORBIKE SOUND SIMULATOR

BACKGROUND OF THE INVENTION

1. Field of the Invention

The present invention pertains to bicycle accessories. More specifically the present invention pertains to apparatus for attachment to a bicycle for simulating the sound of a motorbike.

2. Description of the Prior Art

There are millions of bicycles. Many of these are owned by children who like to play as if they were operating a motorbike or motorcycle. These children are too young or too economically disadvantaged to be able to purchase a motorbike or motorcycle. Children may improvise by attaching items to their bicycle which simulate the sound of a motor. For example, a playing card may be attached to the fork of a bicycle by a clothes pin or some other apparatus so that the edge of the playing card engages spokes of the bicycle wheel as the wheel rotates. The sound of the playing card sequentially engaging the bicycle spokes is an attempt to simulate the sound of the motor.

Such improvisation is less than effective and may not last very long. Furthermore, there is a danger of damaging bicycle spokes if the improvised apparatus is not properly attached to the bicycle. Other solutions are needed.

SUMMARY OF THE PRESENT INVENTION

In the present invention, apparatus is provided for attachment to a bicycle to simulate the sound of a motor. The apparatus comprises a strip of semi-rigid plastic, a substantial portion of which is straight, terminating in a free distal end. In a preferred embodiment, the remainder of the strap is bent back against the first portion and then curved in a reverse direction therefrom to form a loop portion for encircling a support member of a bicycle. Holes are provided in the strap for engagement by a fastener device for fixing the apparatus to a bicycle support member so that the distal end of the strap is positioned for sequential engagement by the spokes of a bicycle wheel, as it turns, to simulate the sound of a motor.

The selection of materials, fastener means and spacing of holes on the strap are important features for manufacture, installation and effectiveness of the motor sound simulating apparatus. A number of objects and advantages of the invention will be understood from reading the specification which follows in conjunction with the accompanying drawings.

DESCRIPTION OF A PREFERRED EMBODIMENT OF THE INVENTION

Figure 1:
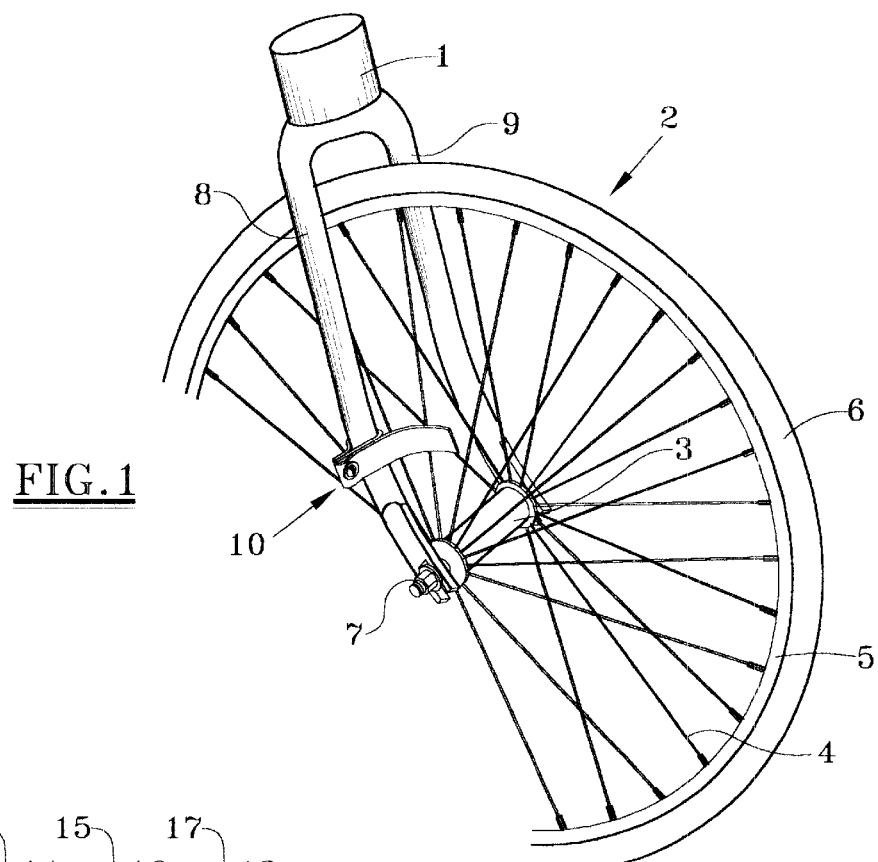
FIG. 1 is a pictorial illustration of a portion of a bicycle showing the wheel thereof disposed between supports thereof and to one of the supports of which is affixed the motor sound simulating apparatus of the present invention.

Referring first to FIG. 1, there is shown a forked support 1 of a bicycle between which is mounted a bicycle wheel 2 comprising a central hub 3 from which radially projects spokes 4 for supporting a rim 5 and tire 6. The hub 3 rotates about an axle 7 the opposite ends of which are supported in one of the forks or supports 8, 9 of the bicycle fork 1.

Figure 2:
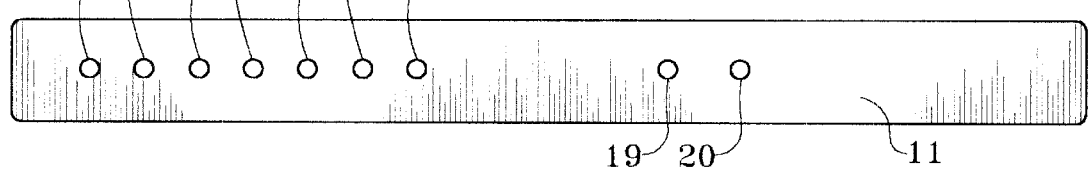
FIG. 2 is a plan view of a strap from which one component of the apparatus of the present invention may be formed, according to a preferred embodiment of the invention.

Attached to one of the support members, support member 8 in FIG. 1, is the apparatus 10 of the present invention which, when attached to a bicycle, simulates the sound of a motor. The apparatus 10, as best seen in FIG. 2, comprises a strap 11 of semi-rigid plastic. Polypropylene has been found to be an excellent material. The strap 11 is approximately $1/16$ of an inch thick and is preferably $5/8$ of an inch to $7/8$ of an inch wide and 8 to 12 inches long. It is provided with a number of holes or apertures 12–20. Although the location of holes can be different, it has been found that the location of hole 12 at $3/8$ of an inch from the end of the strap, hole 13 at $7/8$ of an inch from the end of the strap and holes 14–18 being equally spaced at distances of $3/8$ of an inch are particularly effective. Holes 19 and 20 are preferably at $4 3/4$ of an inch to $5 3/4$ of an inch from the same end of the strap. Although it is not critical, the hole size in the preferred embodiment is $5/32$ of an inch in diameter.

Figure 3:
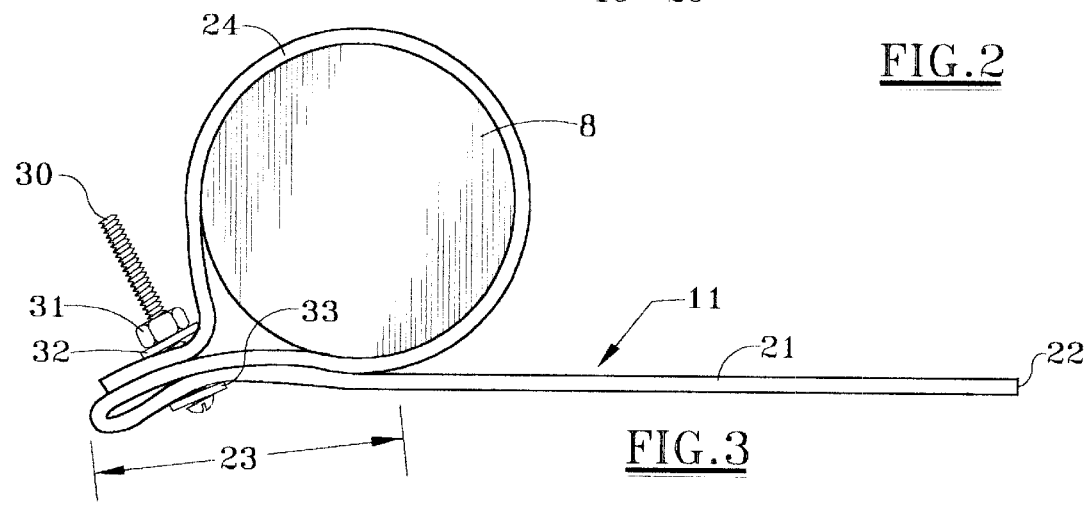
FIG. 3 is a view, partially in section, of the motor sound simulating apparatus of the present invention as formed and attached to the support member of a bicycle, according to a preferred embodiment of the invention.

In forming a preferred embodiment of the apparatus of the present invention, as best seen in FIG. 3, a substantial portion 21 of the strap 11 remains straight terminating in a distal end 22. The remainder of the strap 11 is bent back against the first portion, forming an area of double thickness 23, and then curved in a reverse direction therefrom to form a loop portion 24 for encircling the bicycle support member 8.

The strap 11, in this form, is then affixed to the support member 8 by fasteners which in the preferred embodiment comprises a machine screw 30, nut 31 and washers 32 and 33. The screw 30 passes through the holes 19 and 20 in the double thickness area 23 of the strap 11 and through one of the holes 12–18 near the end of the loop portion 24. One of the washers 33 surrounds the screw 30 adjacent the head of the screw 30 and the other of the washers 32 surrounds the screw 30 adjacent the nut 31 which is threaded to the opposite end of the screw 30. In the preferred embodiment, the screw 30 is a $5/32$ by 1.5 inch machine screw for which No. 6 washers would be the normal size. However, in the preferred embodiment, washers 32 and 33 are No. 8 washers which have larger hole diameters than the normally appropriate No. 6 washers. This allows the washers 32 and 33 to tilt relative to the axis of the screw 30. This is necessary because in some applications the strap is not perpendicular to the machine screw 30 but may be at an angle thereto. It should also be noted that the hole spacing and the fastener positioning keeps the screw 30 away from the support 8 so as to not harm the paint finish thereof.

When the loop portion 24 of the strap 11 is placed around the support 8 and the screw 30 engaged with selected holes thereof the flat portion 21 of the strap 11, and specifically the distal end 22 thereof, may be properly positioned for engagement with the spokes of the bicycle. The screw 30 is then tightened so that the apparatus stays in position and will not be moved out of position when struck by the spokes of the bicycle. It makes little difference whether the strap 11 engages the spokes 4 forward or rearward of the forked support 1 or which side of the strap engages the spokes. Any of these positions is effective. The sound produced by sequential engagement of the straight portion 21 and the distal end 22 of the strap 11 produces the sound of a motorbike. The sound can be varied by varying the angle of the straight portion 21 of the strap relative to the spokes. If desired, the apparatus can also be loosened, if necessary, and turned so that the strap does not engage the spokes; terminating the motor sound.

The apparatus of the present invention provides an effective means of producing the sound of a motorbike through a relatively simple, inexpensive and easy to install device. It should provide many hours of enjoyment to children who use the apparatus and to the parents who take enjoyment out of the happiness of a child.

A single preferred embodiment of the invention has been described herein. However, many variations thereof will be apparent to those skilled in the art without departing from the spirit of the invention. Accordingly, it is intended that the scope of the invention be limited only by the claims which follow.

What is claimed is:

1. Apparatus for attachment to a bicycle to simulate the sound of a motor comprising:
    a strap of semi-rigid plastic a substantial first portion to which is straight terminating in a free distal end and a second portion of which is bent back against said first portion forming an area of double thickness from which the remainder of said strap curves in reverse direction therefrom to form a loop portion for encircling a support member of a bicycle; and
    fastener means engageable with said first and second portion of said strap in said area of double thickness and with said loop portion of said strap to affix said apparatus to said support member so that said distal end of said strap may be sequentially engaged by the spokes of a bicycle wheel to simulate the sound of a motor.

2. The motor simulating apparatus of claim 1 in which said strap is provided with holes through said first and second portions of said strap in said area of double thickness and one or more holes near the end of said loop portion, said fastener means being engageble with said holes through said double thickness of said strap and said one or more holes near the end of said loop portion for affixing said strap to said support member.

3. The motor simulating apparatus of claim 2 in which said fastener means comprises a screw, a nut and two washers, said screw passing through said holes through said double thickness of said strap and one of said one or more holes near the end of said loop portion, one of said washers surrounding said screw adjacent the head of said screw and the other of said washers surrounding said screw adjacent to said nut which is threaded to the opposite end of said screw.

4. The motor simulating apparatus of claim 3 in which the hole diameters of said washers are of a size larger than the hole diameter of washers normally appropriate for said screw allowing said washers to tilt relative to the axis of said screw when tightened against said strap whether or not said strap portions are parallel to each other.

5. The motor simulating apparatus of claim 4 in which said one or more holes near the end of said loop portion comprises a plurality of holes at preselected spaced intervals, allowing a specific one of said holes to be selected for engagement by said fastener means for varying the size of said loop portion to accommodate bicycle support members of differing dimensions.

6. The motor simulating apparatus of claim 2 in which said one or more holes near the end of said loop portion are located at preselected positions which when engaged by said fastener means keeps said fastener means away from contact with said bicycle support member.

7. The motor simulating apparatus of claim 2 in which said strap is made of 1/16 inch polypropylene and is 5/8 to 7/8 inches wide and 8 to 12 inches long.

* * * * *